(12) United States Patent
Middelkoop

(10) Patent No.: US 10,869,530 B2
(45) Date of Patent: Dec. 22, 2020

(54) FINGER TIP POSITIONING DEVICE AND KIT

(71) Applicant: EHMS Holding B.V., Rotterdam (NL)

(72) Inventor: Emely Hélène Middelkoop, Rotterdam (NL)

(73) Assignee: EHMS Holding B.V., Bergschenhock (NL)

( * ) Notice: Subject to any disclaimer, the term of this patent is extended or adjusted under 35 U.S.C. 154(b) by 52 days.

(21) Appl. No.: 15/999,741

(22) PCT Filed: Feb. 17, 2017

(86) PCT No.: PCT/NL2017/050096
§ 371 (c)(1),
(2) Date: Aug. 20, 2018

(87) PCT Pub. No.: WO2017/142409
PCT Pub. Date: Aug. 24, 2017

(65) Prior Publication Data
US 2019/0208885 A1    Jul. 11, 2019

(30) Foreign Application Priority Data

Feb. 19, 2016  (NL) ...................... 2016295
Sep. 5, 2016   (NL) ...................... 2017420

(51) Int. Cl.
*A45D 29/02*   (2006.01)
*A45D 29/22*   (2006.01)
(Continued)

(52) U.S. Cl.
CPC .............. *A45D 29/02* (2013.01); *A01K 13/00* (2013.01); *A01K 17/00* (2013.01); *A45D 29/023* (2013.01); *A45D 29/22* (2013.01); *A45D 2200/25* (2013.01)

(58) Field of Classification Search
CPC .... A01K 13/00; A01K 17/00; A45D 2200/25; A45D 29/02; A45D 29/023
See application file for complete search history.

(56) References Cited

U.S. PATENT DOCUMENTS 5,490,327 A * 2/1996 Ohori .................. A45D 29/02
                                          132/75.5
5,791,049 A * 8/1998 Dolev .................. A45D 29/02
                                          132/75.5
(Continued)

FOREIGN PATENT DOCUMENTS

DE    2413887 A1    10/1975
JP    442104       1/1969
(Continued)

*Primary Examiner* — Stephen Choi
(74) *Attorney, Agent, or Firm* — The Webb Law Firm

(57) ABSTRACT

A fingertip positioning member for coupling to a nail clipper has a first and a second cutting edge together forming a clipping line for the purpose of facilitating clipping of the nail while applying the combination of the fingertip positioning member and the nail clipper. The fingertip positioning member may have an elongate body with a contact surface for making contact with a contact surface of the nail clipper. The member may also have a mechanism for coupling to the nail clipper, and a placing support for laying a fingertip against the placing support for suitable positioning with the nail thereof in supported manner relative to the nail clipper.

19 Claims, 7 Drawing Sheets

(51) Int. Cl.
*A01K 13/00* (2006.01)
*A01K 17/00* (2006.01)

(56) References Cited

U.S. PATENT DOCUMENTS

| | | | |
|---|---|---|---|
| 5,918,375 A | | 7/1999 | Rossi, III |
| 6,088,919 A | * | 7/2000 | Gilman ................ A45D 29/023 |
| | | | 132/75.5 |
| 2014/0291182 A1 | * | 10/2014 | Cascio ...................... A45F 5/02 |
| | | | 206/389 |

FOREIGN PATENT DOCUMENTS

| | | | |
|---|---|---|---|
| JP | 2005192716 A | * | 7/2005 |
| JP | 2005192716 A | | 7/2005 |
| JP | 2006204637 A | | 8/2006 |

* cited by examiner

FINGER TIP POSITIONING DEVICE AND KIT

CROSS-REFERENCE TO RELATED APPLICATIONS

This application is the United States national phase of International Application No. PCT/NL2017/050096 filed Feb. 17, 2017, and claims priority to Dutch Patent Application Nos. 2016295 and 2017420 filed Feb. 19, 2016, and Sep. 5, 2016, respectively, the disclosures of which are hereby incorporated in their entirety by reference.

The present invention relates to a fingertip positioning member for coupling to a nail clipper, comprising a first and a second cutting edge together forming a clipping line for the purpose of facilitating clipping of the nail while applying the combination of the fingertip positioning member and the nail clipper. The present invention also relates to a kit comprising a nail clipper and a fingertip positioning member according to the present invention. Nail clippers have been known for many years as a suitable manner of clipping nails. A nail clipper is generally more practical in use than scissors, since the nail clipper clamps the nail in fixed orientation before the nail is clipped. The nail clipper nevertheless has the drawback that it is still possible to damage the fingertip during clipping of the nail. In order to obviate such a drawback the present invention provides a fingertip positioning member for coupling to a nail clipper, comprising a first and a second cutting edge together forming a clipping line for the purpose of facilitating clipping of the nail while applying the combination of the fingertip positioning member and the nail clipper, the fingertip positioning member comprising:

a preferably substantially elongate body comprising a contact surface for making contact with a contact surface of the nail clipper, coupling means for coupling to the nail clipper, and a placing support for laying a fingertip against the placing support for suitable positioning with the nail thereof in supported manner relative to the nail clipper.

A first advantage according to the present invention is that, by means of applying such a fingertip positioning member in mutual coupling with a nail clipper, damage to the fingertip is prevented because of the stable placing, or 'fit', of the fingertip against the placing support. Where the existing nail clipper tapers from the cutting edge away from the fingertip, and does not therefore provide any support at all, with use of the present invention it is precisely at the fingertip that support is provided relative to the nail clipper.

A further advantage according to the present invention is that a predetermined length of the nail can be set by means a predetermined distance between the contact surface and the cutting edge. Such a length is envisaged between for instance 0.1 mm and 2 cm, more preferably between 0.2 mm and 1.2 cm, more preferably between 0.3 mm and 1 cm. Any other limit to the lengths of the fingernail not to be cut is likewise provided for within these length ranges.

According to a first preferred embodiment, the placing support is arrangeable in front of the clipping line of the nail clipper. It hereby becomes possible to clip a nail to a predetermined length while applying the fingertip positioning member according to the present invention. The placing support is more preferably arrangeable here substantially below the clipping line. This is advantageous in the case the nail is located on the upper side of the finger.

According to a further preferred embodiment, the coupling means are configured for co-action with a guide member of the nail clipper. Use is hereby made in advantageous manner of the structure of the nail clipper and the member is mounted firmly and robustly on the nail clipper.

The coupling means are more preferably embodied as a slot for receiving the guide member of the nail clipper there through. The head of the guide pin of the nail clipper can hereby be applied in advantageous manner for mounting of the member.

The coupling means are more preferably embodied as a slot comprising an engaging edge, preferably along the periphery of the slot, for engaging a head of the guide member of the nail clipper.

In a further preferred embodiment the placing support in the fingertip positioning member is embodied as a curved surface, in this case a surface with a curvature therein, suitable for finding alignment with at least a part of a fingertip.

A further aspect according to the present invention relates to a kit comprising a fingertip positioning member according to one or more of the foregoing claims together with a nail clipper. Advantages are hereby obtained as according to the above described preferred embodiments.

Further advantages, features and details of the present invention will be described in greater detail hereinbelow on the basis of one or more preferred embodiments with reference to the accompanying figures. Similar, though not necessarily identical components of different preferred embodiments are designated with the same reference numerals.

Figure 1:
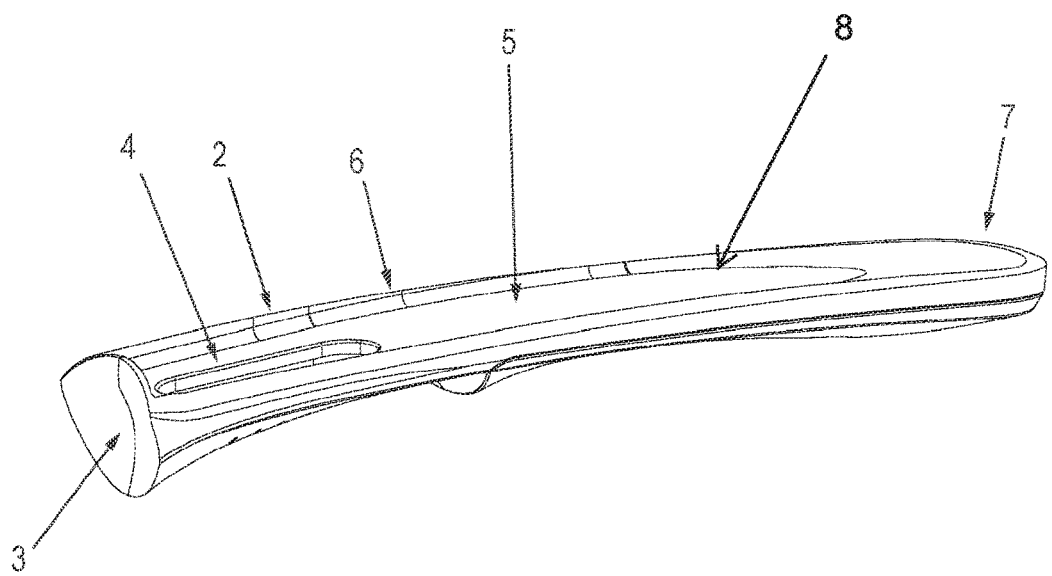
FIG. 1 is a perspective view of a fingertip positioning member in accordance with a first preferred embodiment according to the present invention.

A first preferred embodiment according to the present invention relates to a fingertip positioning member 1 comprising an elongate body 5 having on the front side a placing support 3 in the form of a curved surface 3. This surface serves for positioning of the fingertip thereagainst in order to support it relative to the nail clipper combinable with the fingertip positioning member, and in particular a cutting edge 16, 17 thereof.

Fingertip positioning member 1 has a contact surface 8 for making contact with an underside of the nail clipper. Also provided is a slot 4 for co-action with a guide pin 15 of the nail clipper. A toothed edge 9 is provided 20 here for the purpose of providing a predetermined number of positions. A smooth edge can likewise be provided instead of toothed edge 9 for the purpose of providing an infinite number of positions.

Provided along the periphery of contact surface 8 is support edge 6. It is envisaged that the size of the nail clipper is such that it fits within support edge 6, but that there is also clearance between the clipper and the support edge. A close fit is not required. This is possible because the mounting by means of a guide member, or guide pin 15, of the nail clipper imparts a high measure of sturdiness.

For the sake of completeness, the nail clipper comprises a lower metal cutting member 14, an upper metal cutting member 13 and a pressing element 2 for moving cutting edges 16, 17 toward each other along guide pin 15.

Figure 5:
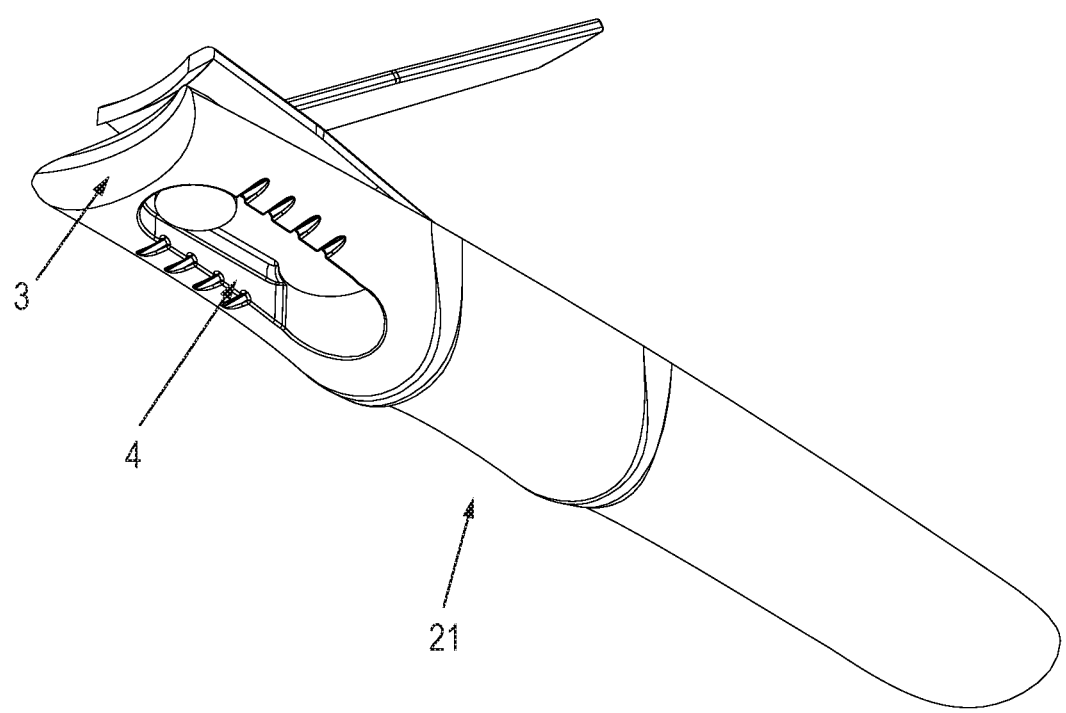
FIG. 5 shows a further preferred embodiment in combination with a nail clipper.
Figure 6:
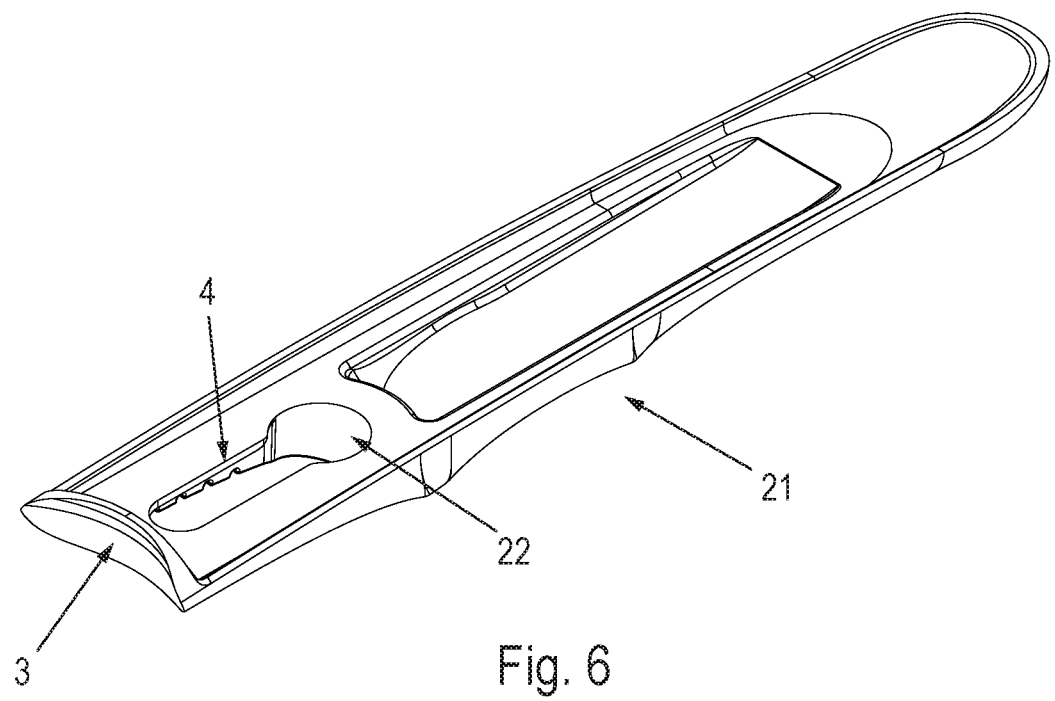
FIG. 6 is a perspective view hereof.
Figure 7:
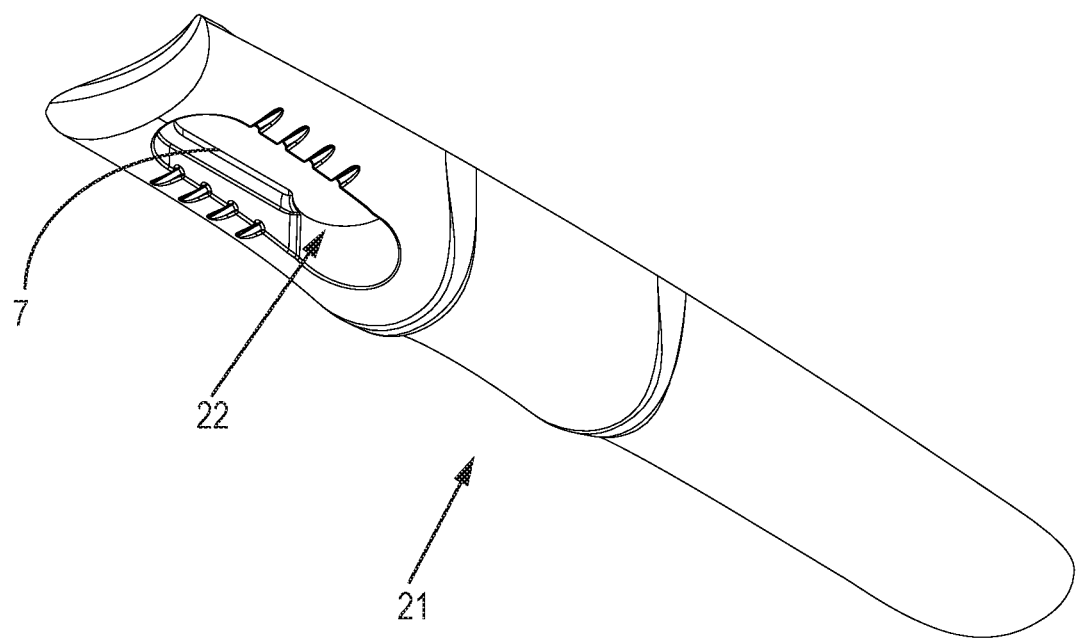
FIG. 7 is a further perspective view hereof.

A further preferred embodiment relates to fingertip positioning member 21 (FIG. 5). This has a placing support 3 which makes contact with a strip of the fingertip for positioning thereof relative to the nail clipper and the cutting edges thereof.

Slot 4 of this preferred embodiment has the smooth edge referred to in the foregoing. This slot also has a passage opening for passage of the guide pin of the nail clipper for the purpose of removing fingertip positioning member 21 relative to the nail clipper.

Figure 2:
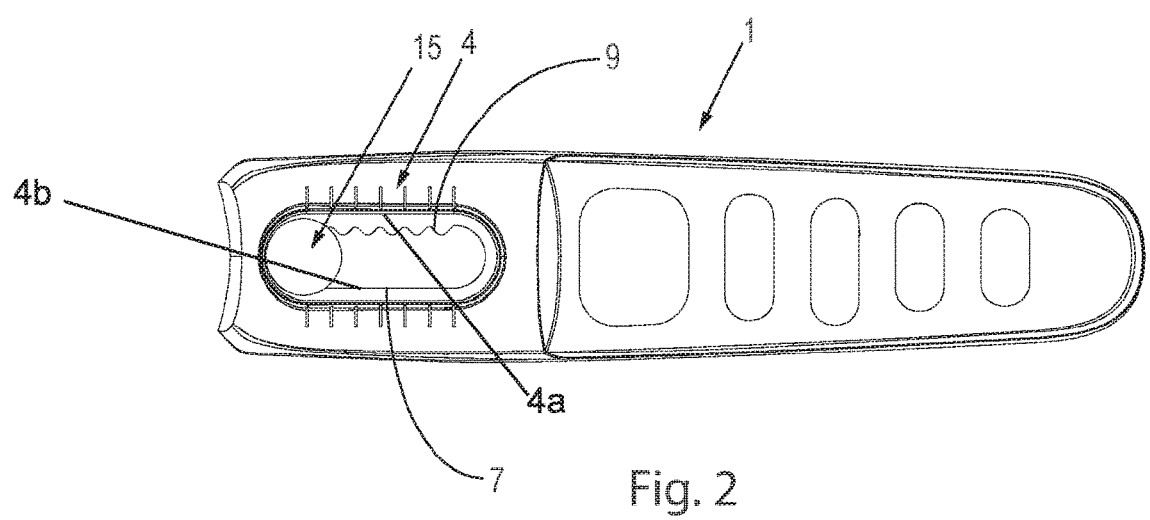
FIG. 2 is a bottom view of this preferred embodiment.
Figure 3:
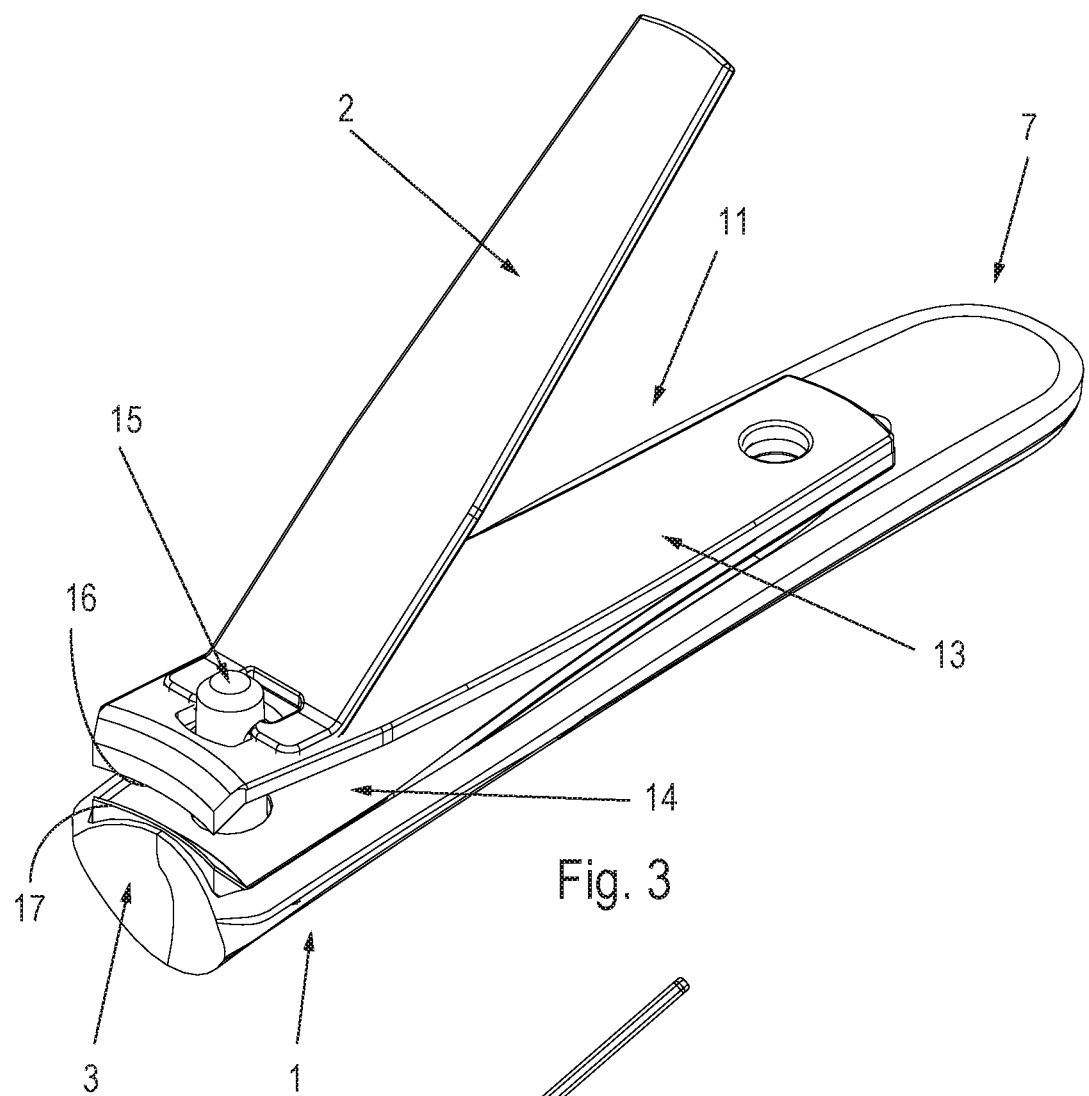
FIG. 3 is a perspective view of the preferred embodiment according to FIG. 1 in combination with a nail clipper.
Figure 4:
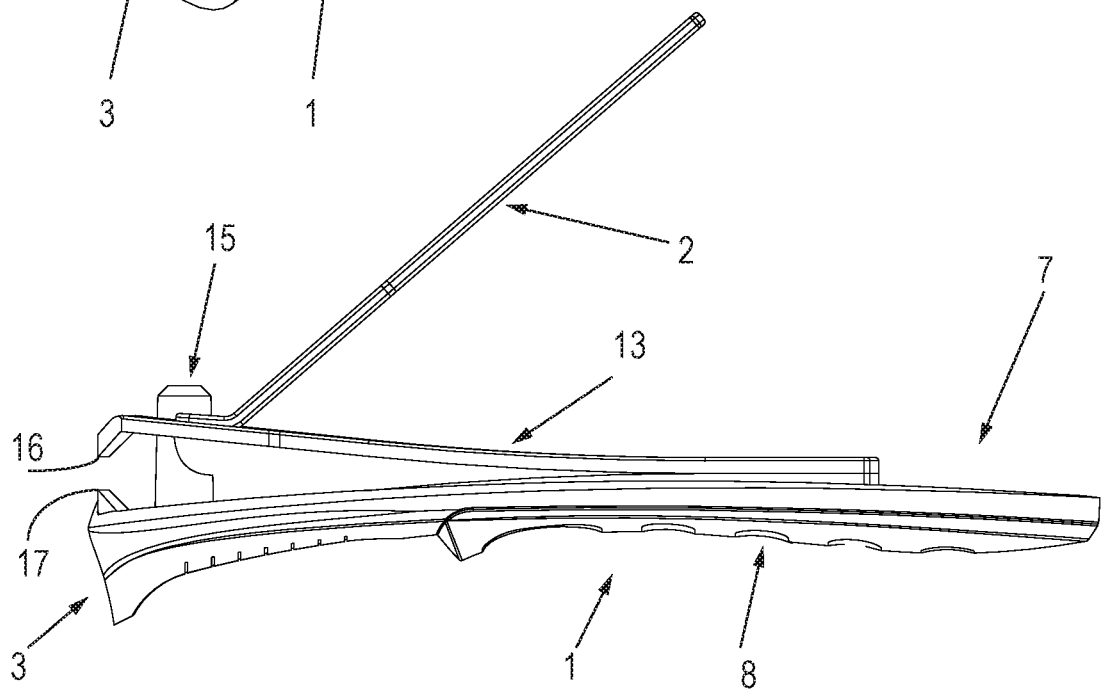
FIG. 4 is a side view hereof.

Provision is made in both preferred embodiments that the edge 7 of the slot which serves to engage the guide pin is manufactured from a metal for the purpose of an increased durability thereof. In the case of a method for manufacturing the member by means of an injection moulding process this engaging edge 7 is in such a case moulded into the material of the body during the injection moulding process. The engaging edge 7 (FIG. 2) is recessed within the slot 4. The slot 4 has elongated walls 4a, 4b extending along a length of the slot 4. The engaging edge 7 protrudes from the elongated walls 4a, 4b.

Figure 8:
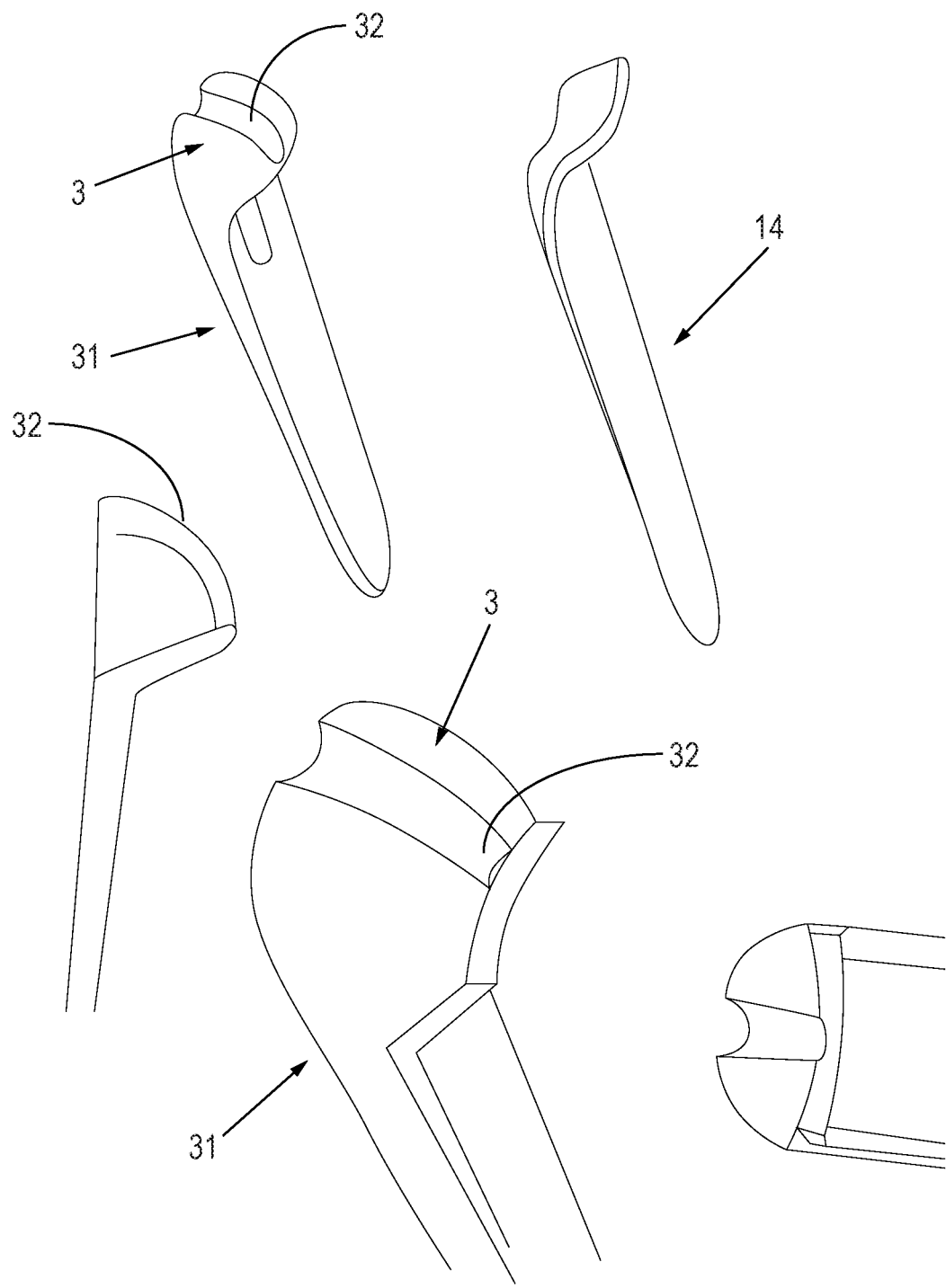
FIG. 8 shows a number of views with a receiving groove for receiving a nail of an animal according to a further preferred embodiment.

The preferred embodiment according to FIG. 8 has a fingertip positioning member 31 provided with a differently formed placing support with a groove 32 formed therein for receiving a nail of an animal. A nail of an animal is hereby positioned in reliable manner relative to the cutting edge of element 14.

Figure 9:
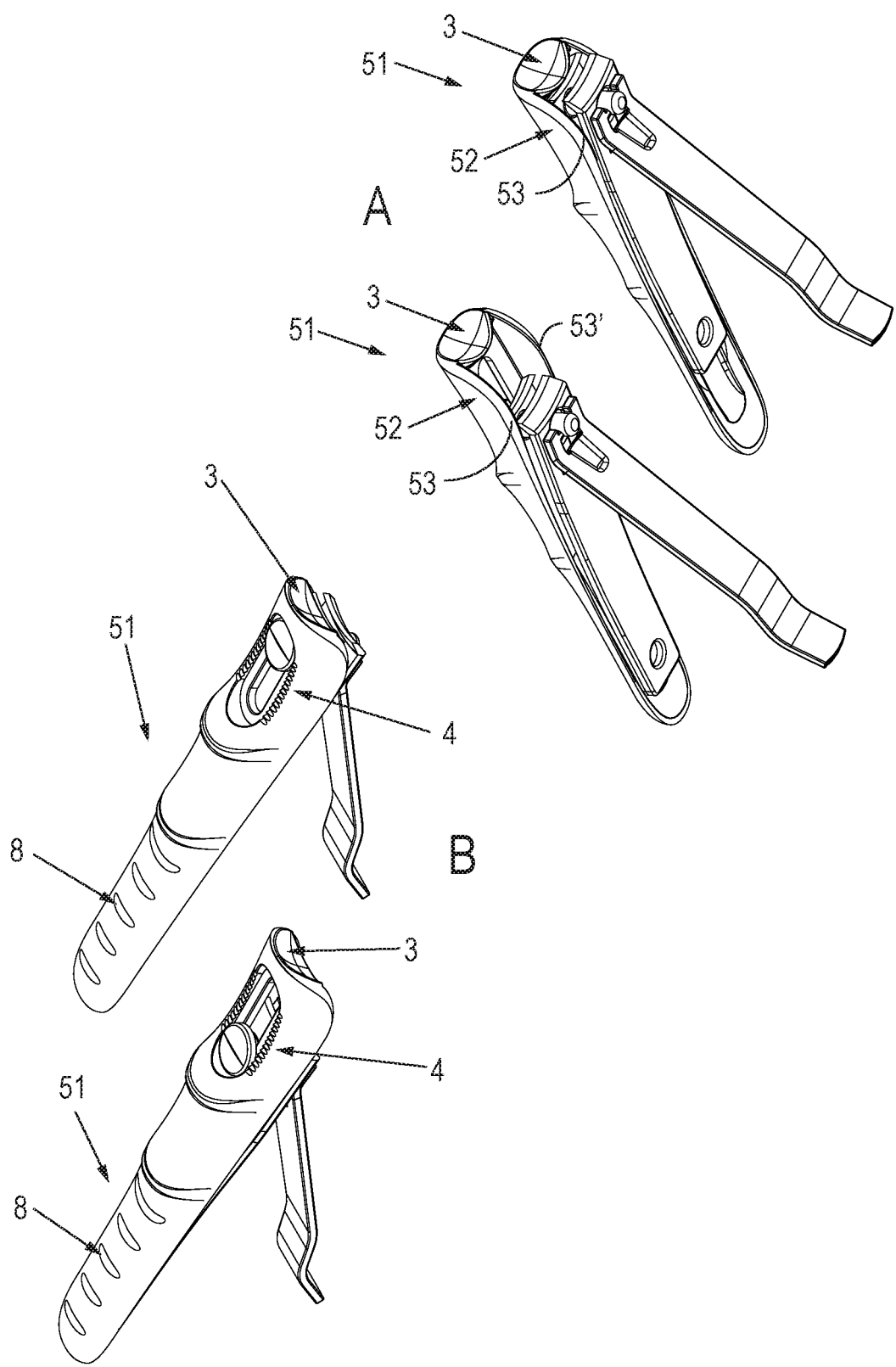
FIG. 9 shows ten views of a further preferred embodiment according to the present invention.
Figure 9:
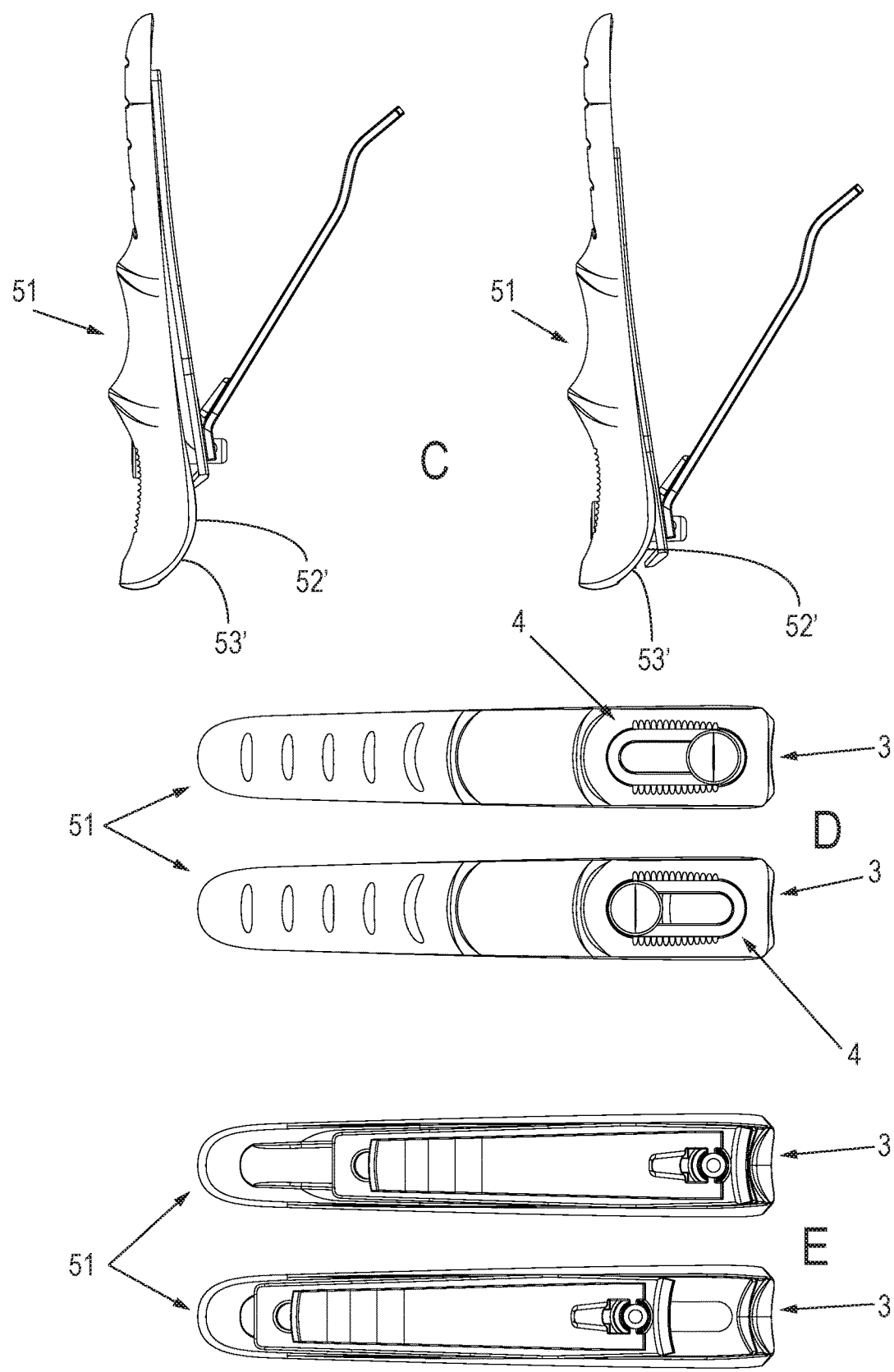

In FIG. 9 the nail clipper is shown in each case in a foremost and a rearmost position, between which it is adjustable depending on the desired nail length.

For the purpose of preventing clipped nail parts flying about immediately upon severing thereof, in the preferred embodiment of fingertip positioning member 51 retaining edges 52, 52' are provided on either side thereof. The retaining edges have respective upper edges 53, 53'. These upper edges 53, 53' are formed with a curved shape having on the front side a somewhat steep onset in order to achieve sufficient height to function when the cutting edge of the nail clipper is situated in a position close to the leading edge.

After being clipped the nail parts are collected between the retaining edges. The nail parts can always be shaken out, or several parts of severed nail can be held in the space between the retaining edges and the nail clipper.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. A fingertip positioning member for coupling to a nail clipper, comprising a first and a second cutting edge together forming a clipping line for the purpose of facilitating clipping of the nail while applying the combination of the fingertip positioning member and the nail clipper, the fingertip positioning member comprising:

an elongate body comprising a contact surface for making contact with a contact surface of the nail clipper, coupling means for coupling the elongate body to the nail clipper, a placing support for laying a fingertip against the placing support for suitable positioning with the nail thereof in supported manner relative to the nail clipper, and wherein the coupling means comprises an elongated slot for receiving a guide member of the nail clipper therethrough, wherein the slot has elongated walls extending along a length of the slot, wherein the slot has an engaging edge protruding from the elongated walls, wherein the engaging edge is adapted for engaging and securing a head of a guide member of the nail clipper, wherein the engaging edge is recessed within the slot such that the head of the guide member may be recessed within the slot, and wherein a portion of the engaging edge is toothed to provide a predetermined number of positions for the nail clipper relative to the elongate body.

2. The fingertip positioning member as claimed in claim 1, wherein the placing support is adapted to extend beyond the clipping line of the nail clipper.

3. The fingertip positioning member as claimed in claim 1, wherein the placing support is adapted to be positioned below the clipping line.

4. The fingertip positioning member as claimed in claim 1, wherein the coupling means are adapted to engage with the guide member of the nail clipper.

5. The fingertip positioning member as claimed in claim 1, wherein the engaging edge is embodied as a material moulded into the body which differs from the material of the body.

6. The fingertip positioning member as claimed in claim 5, wherein the engaging edge is embodied as a metal body following the edge of the slot.

7. The fingertip positioning member as claimed in claim 1, wherein the coupling means are embodied substantially in a flange form extending in the coupling means.

8. The fingertip positioning member as claimed in claim 1, wherein the placing support is embodied as a curved surface, in this case a surface with a curvature therein, suitable for finding alignment with a fingertip.

9. The fingertip positioning member as claimed in claim 1, wherein the placing support is configured to receive a claw-like nail.

10. The fingertip positioning member as claimed in claim 1, wherein the placing support is suitable for receiving the whole of a curved end surface of the fingertip.

11. The fingertip positioning member as claimed in claim 1, wherein the placing support is suitable for receiving substantially a strip part of a curved end surface of the fingertip, wherein the strip part is preferably situated along the nail.

12. The fingertip positioning member as claimed in claim 1 wherein the fingertip positioning member has a length greater than the length of a nail clipper to which it is adapted to receive.

13. The fingertip positioning member as claimed in claim 1, comprising one or more parts of an engaging surface for providing an engagement on one or more fingers of a hand.

14. The fingertip positioning member as claimed in claim 1, comprising at least one enclosing member for enclosing the nail clipper along the edge of the contact surface thereof.

15. The fingertip positioning member as claimed in claim 1, comprising an enclosing edge along the contact surface thereof.

16. The fingertip positioning member as claimed in claim 1, wherein the coupling means comprise adjusting means for adjusting the distance.

17. The fingertip positioning member as claimed in claim 1, comprising retaining edges for retaining clipped nail parts.

18. The fingertip positioning member as claimed in claim 17, wherein the retaining edges are arranged on one or both sides at the location of a position of arrangement of the cutting edge of the nail clipper.

19. A kit comprising a fingertip positioning member as claimed in claim 1 together with a nail clipper.

* * * * *